Patented Sept. 28, 1937

2,094,117

UNITED STATES PATENT OFFICE 2,094,117

HYDROGENATION PROCESS

Rollin J. Byrkit, Jr., Marshallton, Del., assignor to Hercules Powder Company, Wilmington, Del., a corporation of Delaware No Drawing. Application February 5, 1935, Serial No. 5,067

16 Claims. (Cl. 260—99.40)

This invention relates to a process of hydrogenation, and more particularly to a process for the hydrogenation of rosin or abietic acid and other compounds containing the hydrocarbon nucleus of abietic acid, as, for example, abietic acid esters, as methyl abietate, ethyl abietate, glyceryl abietate, etc.; abietyl alcohol; esters of abietyl alcohol; etc. All of such compounds containing the hydrocarbon nucleus of abietic acid are hereinafter referred to as abietyl compounds.

Heretofore the hydrogenation of rosin and other abietyl compounds has been successfully accomplished, from a practical standpoint, only when the hydrogenation is carried out by a batch or non-continuous process. Under such conditions the rosin or abietyl compound is placed in a closed vessel, as, for example, an autoclave, together with the catalyst, which is usually in the form of a finely divided powder, and hydrogen is admitted under pressure. The conditions of temperature and hydrogen pressure are adjusted to meet the requirements of the hydrogenation process, and after the lapse of a sufficient time the hydrogenation is completed.

From the commercial or economic standpoint, and even from a technical standpoint, such non-continuous hydrogenation procedure is subject to many disadvantages, certain of which are due to the non-continuous nature of the process and others of which are due to the type of catalyst necessarily employed. Among these disadvantages of processes for the hydrogenation of rosin and other abietyl compounds heretofore practiced the following may be specifically considered.

At the conclusion of a batch hydrogenation it is necessary to filter or otherwise separate the hydrogenated abietyl compound from the catalyst employed. This requires the maintenance of suitable equipment and represents an expensive and time consuming operation. Where the catalyst used is in powder form, as is usually the case, it can be separated from the viscous molten rosin only with very great difficulty.

The catalyst is in service for only a portion of the time required for a complete cycle of operations, since during the changing of the hydrogenation vessel, filtration and recovery of the filtered catalyst, the catalyst performs no useful function. In fact, the catalyst is often harmed by the exposure and necessary handling.

Because of this necessary handling and exposure the useful life of the hydrogenation catalyst is greatly shortened and its activity declines more rapidly than would be the case if it were subjected only to the use incident to hydrogenation. Furthermore, when the useful life of the catalyst is at an end, especially if it is of the powder type, it must be discarded, since the requisite reworking necessary to fit it for further use constitutes a greater expense than the procurement of new catalysts.

When a hydrogenation catalyst is used in a non-continuous hydrogenation process it is found that, unless it be a noble metal catalyst, the hydrogenated rosin or other abietyl compound produced is contaminated to an appreciable extent by the catalyst. This contamination occurs each time the catalyst is used in the process and accordingly all the hydrogenated rosin or other abietyl compound produced is contaminated in this manner.

Because of the difficulties occasioned by the separation of catalyst from the hydrogenated rosin it is practically essential to maintain the ratio of catalyst to rosin, or other abietyl compound to be hydrogenated, as low as possible. However, it is known that the rate of hydrogenation is usually in this type of hydrogenation proportional to the amount of catalyst present. Accordingly, maintaining a low catalyst ratio, while economically and practically necessary in non-continuous procedure, is extremely disadvantageous.

It is impossible to maintain the activity of the hydrogenation catalyst in non-continuous hydrogenation processes at a uniform level, although it is extremely desirable that this should be done. The only manner in which the catalyst activity may be maintained at an approximately uniform level in non-continuous processes is by the addition of small increments of fresh catalyst. It is apparent that this practice is limited by the total amount of catalyst which can be filtered and handled in the process.

These are a few of the disadvantages of the batch or non-continuous method of hydrogenating rosin and other abietyl compounds. Despite these disadvantages, however, the art has not been able to proceed satisfactorily in any other manner. Although continuous hydrogenation in the liquid phase has heretofore been practiced with a number of unsaturated materials, such procedure has not been successful when applied to rosin and other abietyl compounds. This is due in part to the extreme difficulty of hydrogenating the second double bond in the hydrocarbon nucleus of abietic acid which makes the hydrogenation of rosin and other abietyl compounds to highly saturated materials extremely difficult, and in part to the very marked action of rosin and other chemically active abietyl compounds upon the types of catalysts heretofore used in continuous liquid phase hydrogenation. The catalysts heretofore used for continuous liquid phase hydrogenation have comprised a support material and impregnated therein or coated thereupon an activated catalytic material, usually a base metal. It has been found that when such catalysts are used in the continuous hydrogenation of rosin, the molten rosin literally strips the active material from its support and completely destroys the activity of the catalyst in passing through the hydrogenation chamber. The rosin is also so contaminated by the catalyst removed, as to be worthless.

Now in accordance with this invention it has been found that an aluminum nickel alloy catalyst which has been treated to render it catalytically active may be employed in the continuous hydrogenation of rosin and other abietyl compounds without being deleteriously affected by the molten rosin and with the production of a hydrogenated material possessing a high degree of saturation.

The catalyst to be used in the continuous hydrogenation of rosin and other abietyl compounds in accordance with this invention may be produced by alloying together aluminum and nickel, breaking the resultant alloy into fragments of the desired size and then treating the alloy with hydrogen or with an alkaline solution, such as sodium carbonate or sodium hydroxide solution to activate the nickel. The production of this catalyst is described more fully in U. S. Letters Patent Nos. 1,628,190, dated May 10, 1927, and 1,915,473, dated June 27, 1933, issued to Murray Raney.

In forming the aluminum nickel alloy from which the catalyst is made it is often desirable to include in the alloy a relatively small amount of other metal as, for example, copper, zirconium, cerium, cobalt, etc., which acts as a promoter and increases the activity of the resultant catalyst for certain hydrogenations. The activity of the catalyst may also be enhanced by heat-treating the alloy, as by annealing, quenching, etc.

For the hydrogenation of rosin and other abietyl compounds the aluminum nickel alloy, which may contain other metals as promoters, or which may have been subjected to heat-treatment is broken into lumps which preferably will all pass through ½" mesh and be retained on 10 mesh screen. The suggested size of the particles of catalyst is in no way a critical limitation upon the catalyst size. The factors to be considered in determining the catalyst size are the fact that the smaller the particles of catalyst the more surface is exposed, and the fact that if the size of the particles is too small the catalyst will be carried along in suspension in the stream of material being hydrogenated or will block and obstruct the flow through the equipment. The size of the catalyst particles should be therefore as small as is possible without producing the disadvantages of small size mentioned above.

These lumps may then be activated by treatment with hydrogen or with an alkali as described in the Raney patents and charged into the hydrogenation equipment. Since the catalyst after activation is intensely active and indeed pyrophoric in nature, it must be transferred to the hydrogenation equipment covered with a film of water or other protective coating. Alternatively, the unactivated catalyst may be charged into the hydrogenation equipment and be activated therein either by the action of hydrogen gas or with an alkali solution. If an alkali solution is used the activated catalyst, in place in the hydrogenation equipment, will be washed free of foreign substances with water and then dried by being heated in a current of hydrogen.

The hydrogenation equipment may be of any form generally used for continuous liquid phase hydrogenation and adapted to withstand the necessary pressures, but preferably it will consist of either a single tube of considerable length in comparison to its diameter or of a plurality of such tubes arranged either in series, in parallel, or in series in parallel.

The active hydrogenation catalyst being in place in the hydrogenation equipment, hydrogenation is begun initially by heating the equipment to the desired temperature, admitting hydrogen gas until the desired hydrogen pressure has been obtained and then admitting the molten rosin, or other abietyl compound in liquid phase. The hydrogenated product may be withdrawn from the equipment clear and free from any suspended catalyst and in a condition such that no filtration whatsoever is required.

Considering only a single tube of the hydrogenation equipment the flow of hydrogen and of the molten rosin or other abietyl compound through the tube may be conducted as follows: The hydrogen and the rosin or other abietyl compound may be fed in at the bottom of the tube and caused to flow upward through the catalyst with the hydrogenated product being drawn off at the top of the tube. The hydrogen and the rosin or other abietyl compound may be admitted at the top of the tube and allowed to flow down through the catalyst, the rosin flowing over and around the lumps of catalyst and the hydrogenated product being withdrawn at the bottom. The hydrogen may be admitted at the bottom and the rosin or other abietyl compound at the top of the tube, the two flowing countercurrently over the catalyst.

Where a plurality of tubes are arranged in series, in parallel, or in series parallel, one of the above described procedures may be followed exclusively, or the direction of flow will be varied in various of the tubes in one battery, the flow being parallel in some tubes and countercurrent in others. It will also be found advantageous to vary the temperature and hydrogen pressure in various of the tubes, although identical temperatures and pressures may be maintained in all the tubes if desired.

The temperature and pressure maintained during hydrogenation of the rosin or other abietyl compound may vary within rather wide limit, but it is usually essential to proceed at relatively high pressures to obtain a highly saturated product. Thus, for example, under a given set of conditions, while the first double bond in rosin and other abietyl compounds is easily hydrogenated at temperatures of about 100° C. and hydrogen pressures of about 1000 lbs. or less per square inch, satisfactory hydrogenation of the second double bond requires temperatures of the order of 210° C.–230° C. and hydrogen pressures of 4000 to 5000 lbs. per square inch. Under other conditions, however, as, for example, when dissolved in a solvent, as naphtha, isopropyl ether, etc., temperatures as low as 70° C. and hydrogen pressures as low as 100 lbs. per square inch may be used with satisfactory results.

When the rosin or other abietyl compound is first passed through the freshly prepared catalyst it will be found that the first samples of hydrogenated product show a very appreciable nickel content. However, after the equipment has been in operation for about 2 to 3 hours the nickel content will be found to drop to less than one part per million and will remain at this exceedingly low figure as long as the continuity of the process is maintained. After an interruption in the process the nickel content will rise again for a short time and will then fall once more to this very low value.

When, after the catalyst has become inactive due to long continued use, it may be readily reactivated by treatment with an alkali solution as, for example, a caustic soda solution. Prior to this reactivation treatment it may be found desirable to extract the spent catalyst with a solvent for the rosin or other abietyl compound being hydrogenated. In some cases it will be found advantageous to give the spent catalyst an acid pickle prior to the reactivation treatment with an alkali solution. Reactivation may be effected without interruption in the hydrogenation process by merely cutting out of the battery of tubes those tubes which contain the spent catalyst and cutting into operation other tubes which contain reactivated or fresh catalyst. This operation can even be performed automatically whenever the percentage hydrogenation of the treated product falls below a predetermined value.

While the preceding description has been directed specifically to the continuous hydrogenation of rosin and other abietyl compounds, it will be appreciated that the aluminum nickel catalyst herein described may be used with great advantage in the continuous hydrogenation of any organic unsaturated material. Thus, for example, acetone may be reduced to iso-propyl alcohol by treatment in the hydrogenation equipment above described at ordinary temperatures and very low hydrogen pressures, and cotton seed oil may be readily hydrogenated at 160° C. and 200 lbs. per square inch hydrogen pressure. Other materials such as phenol, naphthalene, nitrobenzol, furfural, pyridine, castor oil, alpha-terpineol, pinene, turpentine or dipentene may be readily hydrogenated either alone or in solution in a suitable solvent. Glucose or quinine may also be readily hydrogenated when dissolved in a suitable solvent.

It will also be understood that the aluminum nickel alloy may be used to great advantage in the batch or non-continuous process for the hydrogenation of rosin or other abietyl compounds, although a continuous process is, for the reasons hereinbefore stated, greatly to be preferred. For batch hydrogenation conditions of temperature and pressure substantially identical with those referred to above for continuous hydrogenation may be employed. It will be found that the catalyst and the hydrogenated rosin or other abietyl compound may readily be separated at the conclusion of the hydrogenation without the necessity of difficult filtration.

The details and examples hereinbefore set forth are for the purpose of illustration only and are not in limitation of the invention as herein broadly described and claimed.

Abietyl compounds, as the term is used hereinabove and in the claims hereinafter set forth, are defined as compounds containing the hydrocarbon nucleus of abietic acid.

What I claim and desire to protect by Letters Patent is:

1. The method of hydrogenating an abietyl compound which includes flowing an abietyl compound in liquid phase in the presence of hydrogen under superatmospheric pressure and in the presence of heat past a catalyst comprising essentially an activated aluminum-nickel alloy.

2. The method of hydrogenating rosin which includes flowing molten rosin in the presence of hydrogen under superatmospheric pressure and in the presence of heat past a catalyst comprising essentially an activated aluminum-nickel alloy.

3. The method of hydrogenating an abietyl compound which includes flowing an abietyl compound in liquid phase in the presence of hydrogen under superatmospheric pressure and at a temperature of from about 70° C. to about 230° C. past a catalyst comprising essentially an activated aluminum-nickel alloy.

4. The method of hydrogenating an abietyl compound which includes flowing an abietyl compound in liquid phase in the presence of hydrogen under a pressure of from about 100 pounds to the square inch to about 5,000 pounds to the square inch and in the presence of heat past a catalyst comprising essentially an activated aluminum-nickel alloy.

5. The method of hydrogenating rosin which includes flowing rosin in liquid phase in the presence of hydrogen under a pressure of from about 4,000 pounds to the square inch to about 5,000 pounds to the square inch and at a temperature of from about 210° C. to about 230° C. past a catalyst comprising essentially an activated aluminum-nickel alloy.

6. The method of hydrogenating rosin which includes flowing rosin in liquid phase in the presence of hydrogen under a pressure of from about 100 pounds to the square inch to about 5,000 pounds to the square inch and at a temperature of from about 70° C. to about 230° C. past a catalyst comprising essentially an activated aluminum-nickel alloy.

7. The method of hydrogenating rosin which includes flowing rosin in liquid phase in the presence of hydrogen under superatmospheric pressure and in the presence of heat past a catalyst comprising essentially an activated aluminum-nickel alloy in the form of lumps of a size to pass through a half inch mesh screen and be retained on a ten mesh screen.

8. The method of hydrogenating a rosin ester which includes flowing a rosin ester in liquid phase in the presence of hydrogen under superatmospheric pressure and in the presence of heat past a catalyst comprising essentially an activated aluminum-nickel alloy.

9. The method of hydrogenating methyl abietate which includes flowing methyl abietate in liquid phase in the presence of hydrogen under superatmospheric pressure and in the presence of heat past a catalyst comprising essentially an activated aluminum-nickel alloy.

10. The method of hydrogenating glycerol abietate which includes flowing glycerol abietate in liquid phase in the presence of hydrogen under superatmospheric pressure and in the presence of heat past a catalyst comprising essentially an activated aluminum-nickel alloy.

11. The method of hydrogenating an abietyl compound which includes treating an abietyl compound with hydrogen in the presence of a catalyst comprising essentially an activated, heat-treated aluminum-nickel alloy.

12. The method of hydrogenating an abietyl compound which includes treating an abietyl compound with hydrogen in the presence of a catalyst comprising essentially an activated alloy of aluminum, nickel, and a metal selected from the group consisting of copper, zirconium, cerium and cobalt.

13. The method of hydrogenating a rosin which includes flowing rosin in liquid phase in the presence of hydrogen past a catalyst comprising essentially a heat-treated aluminum-nickel alloy.

14. The method of hydrogenating rosin which includes flowing rosin in liquid phase in the presence of hydrogen past a catalyst comprising essentially an activated alloy of aluminum, nickel and a metal selected from the group consisting of copper, zirconium, cerium and cobalt.

15. The method of hydrogenating an unsaturated organic material which includes treating an unsaturated organic material with hydrogen in the presence of a catalyst comprising essentially an activated, heat-treated aluminum-nickel alloy.

16. The method of hydrogenating an unsaturated organic material which includes treating an unsaturated organic material with hydrogen in the presence of a catalyst comprising essentially an activated alloy of aluminum, nickel, and a metal selected from the group consisting of copper, zirconium, cerium and cobalt.

ROLLIN J. BYRKIT, Jr.